United States Patent

Brandis et al.

[11] 3,889,932
[45] June 17, 1975

[54] WORM THROTTLE MEANS

[75] Inventors: Curt Brandis, Westerhof; Oskar Schatz, Neu-Leversen-Harburg, both of Germany

[73] Assignee: Fried. Krupp Gesellschaft mit beschrankter Haftung, Essen, Germany

[22] Filed: Sept. 12, 1973

[21] Appl. No.: 396,996

[30] Foreign Application Priority Data
Sept. 16, 1972 Germany............................ 2245570

[52] U.S. Cl. ................. 259/191; 425/205; 425/209
[51] Int. Cl. ............................ B29b 1/06; B29f 3/02
[58] Field of Search ........... 425/205, 208, 209, 376; 259/97, 191

[56] References Cited
UNITED STATES PATENTS

| | | | |
|---|---|---|---|
| 2,970,341 | 2/1961 | Mallory et al. ..................... | 425/208 |
| 3,158,900 | 12/1964 | Heston............................ | 425/376 X |
| 3,287,477 | 11/1966 | Vesilind.......................... | 425/208 X |
| 3,347,528 | 10/1967 | List et al......................... | 425/376 X |
| 3,355,769 | 12/1967 | Fogelberg........................ | 425/208 |
| 3,522,627 | 8/1970 | Vanzo............................. | 425/208 |
| 3,613,160 | 10/1971 | Loomans et al................... | 425/209 |

Primary Examiner—R. Spencer Annear
Attorney, Agent, or Firm—Walter Becker

[57] ABSTRACT

A worm extruder in which a worm rotates in a cylinder and advances material therein from an inlet to a discharge. The movement of the material in the cylinder is under the control of one or more flow restricting means in the cylinder and surrounding the extrusion worm.

7 Claims, 4 Drawing Figures

WORM THROTTLE MEANS

The present invention relates to a worm extruder for processing synthetic materials and/or elastomers, which is provided with a throttle or choke between the inlet and the extruder mouth which reduces the cross section of the passage for the material to be conveyed.

With heretofore known worm extruders of this type, the throttle or choke is intended primarily for improving the mixing, homogenizing and masticizing effect which the worm exerts upon the material, which effect is determined above all by the geometry of the worm. In this connection special devices are necessary for controlling the feeding to the extruder which devices are generally formed by outer devices, which means devices arranged ahead of the inlet of the extruder and equipped, for instance, with a cutting and weighing device for the insertion of the pellets.

It is an object of the present invention to provide a worm extruder which will no longer require the special separate dosing devices and while simplifying the dosing devices will provide the same in the extruder without in any way affecting the processing effect of the extruder.

This object and other objects and advantages of the invention will appear more clearly from the following specification in connection with the accompanying drawings, in which.

Figure 1:
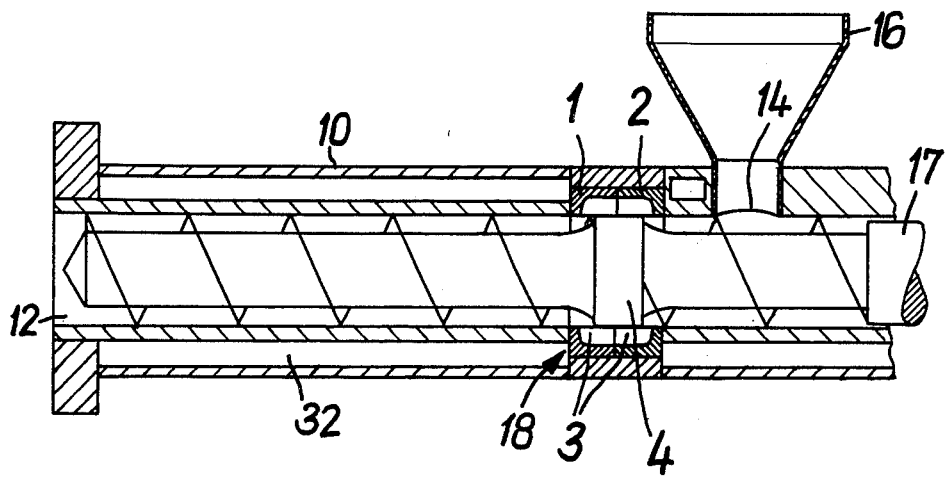
FIG. 1 illustrates a section through an extruder according to the invention with one throttle behind the inlet.

The worm extruder according to the present invention is characterized primarily in that the throttle which is located past the inlet is spaced therefrom at such a short distance only that as supply throttle it will exclusively or substantially determine the quantity to be processed by the extruder per time unit.

This feature is based on the finding that the influence of the throttle upon the processing of the material is all the less the shorter the distance is selected between the throttle and the extruder inlet. On the other hand, the influence upon the quantity to be processed per time unit will first increase with decreasing distance, but will decrease again after the distance becomes less than a certain minimum distance. Accordingly, the throttle is to be arranged past the inlet at such a distance therefrom that the quantity to be processed per time unit will be influenced to an optimum degree and, more specifically, regardless of whether, depending on the specific purpose of employment and design of the extruder, at least partially the effect of the processing of the material will be sacrificed.

Such sacrifice, which can be avoided by particularly carefully selecting the construction and worm geometry in conformity with the specific purpose of employment of the extruder, can in addition thereto be avoided by providing according to the present invention at least one further throttle as processing throttle between the feeding throttle and the extruder mouth. This arrangement will assure that the feeding control by the feeding throttle will be substantially independent of the effect exerted by the processing throttle upon the processing proper. In this way there is obtained a possibility to design extruders in which the two design data can practically at will be combined with each other.

According to a further development of the invention, the feeding throttle is adjustably designed for controlling the cross section of the passage. In this way it will be possible with an extruder design for a certain processing quality to change the output within wide limits while maintaining the design quality, and to adapt the extruder to the operational requirements within the framework of a production line.

For purposes of designing such feeding throttle, it is suggested that it be made of two short throttle discs which in the feeding direction are located directly one behind the other while closely surrounding the feeding worm, the throttle discs being provided along their cylindrical inner surface with overflow grooves which are designed in the manner of thread sections and which are rotatable relative to each other. This construction is simple in design and can without difficulties be mounted in the extruder while it will permit a very fine control.

Referring to the drawings somewhat more in detail, there is illustrated therein an extrusion apparatus which comprises a cylinder 10 having a discharge 12 and a feed opening 14 to which a hopper 16 is connected. The cylinder has an axial bore and rotatable in the cylinder is an extrusion worm 17 having substantially the same diameter as the bore in the cylinder.

According to the present invention, there is disposed in cylinder 10 a predetermined distance downstream from feed opening 14 a flow restricting means generally indicated at 18 and comprising rings 1 and 2 arranged in end to end relation. Disposed within the axial range of rings 1 and 2 is collar 4 formed on extrusion worm 17 and having substantially the same diameter as the worm. Rings 1 and 2 have a cylindrical inner surface substantially the same diameter as collar 4 and formed in the inner surfaces of rings 1 and 2 are grooves 3.

The grooves 3 terminate short of the outward ends of rings 1 and 2 but axially outwardly from opposite ends of collar 4 so that material picked up by the worm from inlet 14 will be caused to move leftwardly along the worm as it rotates and then to be forced through grooves 3 and again picked up by the worm on the left side of the flow restricting means and conveyed therefrom to the discharge 12.

Figure 2:
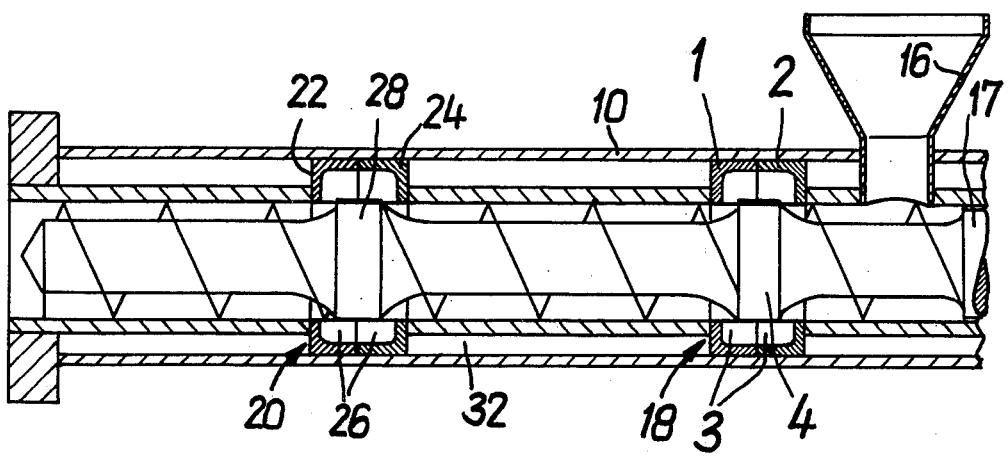
FIG. 2 shows a section through an extruder according to the invention with two throttles.

FIG. 2 shows an arrangement substantially identical with that of FIG. 1 and bearing the same reference numerals. In FIG. 2, the cylinder 10 is somewhat longer than cylinder 10 in FIG. 1 and included therein downstream from flow restricting means 18 is a second like flow restricting means generally indicated at 20 and which also comprises grooved rings 22 and 24 in end to end relation and having grooves 26 formed on the inside thereof through which material is forced by extrusion worm 17. As in connection with the flow restricting means 18, flow restricting means 20 includes a collar 28 on the extrusion screw.

Figure 3:
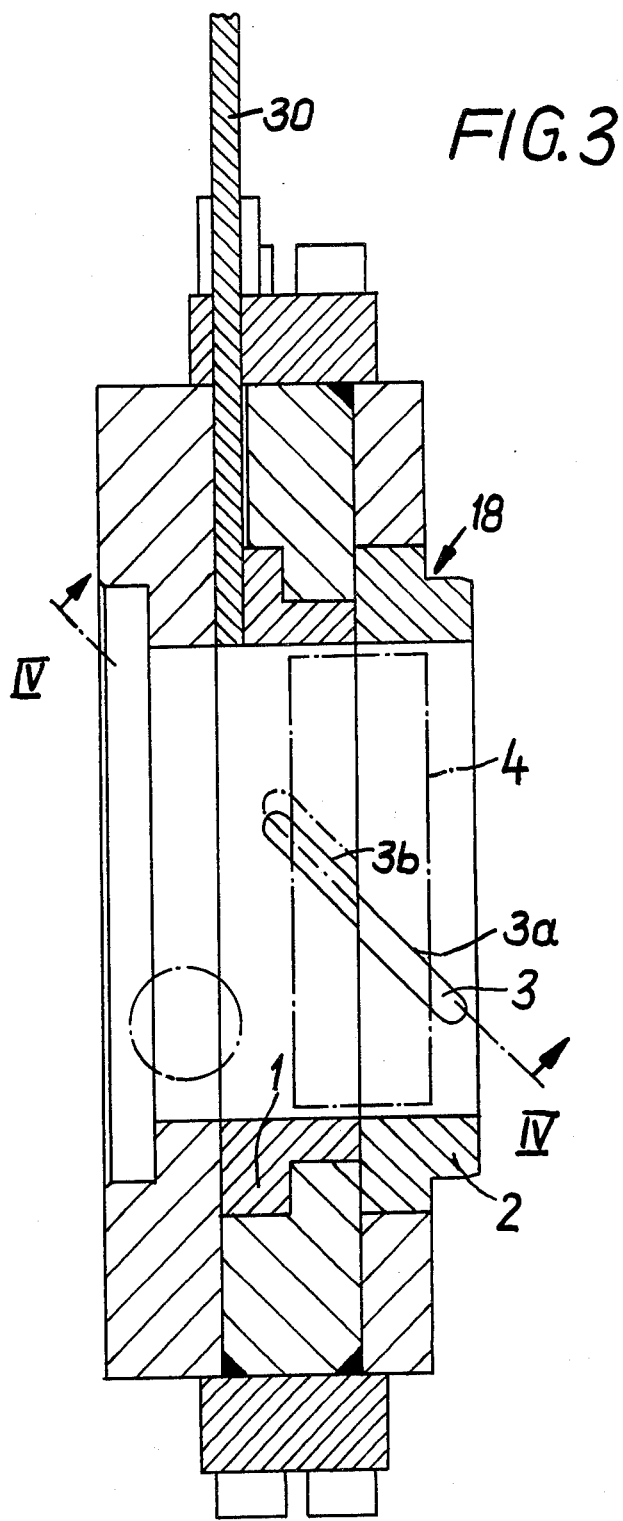
FIG. 3 illustrates on an enlarged scale a cross section through a throttle with overflow grooves in top view.
Figure 4:
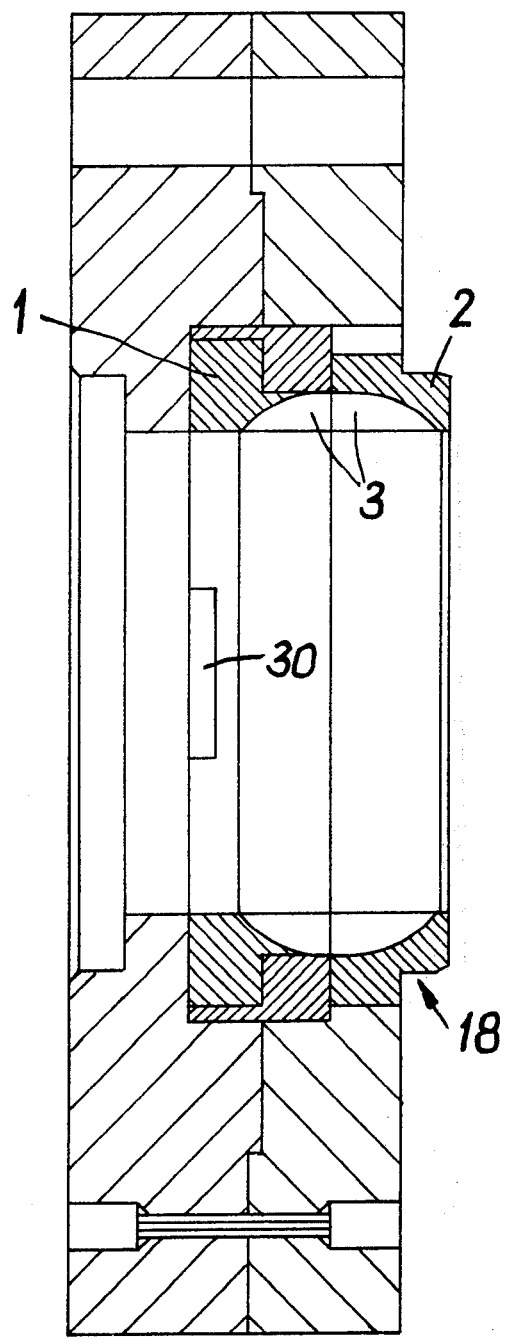
FIG. 4 shows a section taken along the line IV—IV of FIG. 3 with the grooves illustrated in section.

FIGS. 3 and 4 show somewhat more in detail the construction of at least the flow restricting means 18 of FIG. 1. FIG. 3 will show that the groove means formed on the inside of the flow restricting means extends generally helically and consists of a portion 3a in ring 2 and a portion 3b in ring 1. The degree of restriction offered by the flow restricting means to the flow of fluid there-through can be varied by varying the registration of groove portions 3a and 3b and this can be accomplished by adjusting rings 1 and 2 relatively in the angular direction.

To this end, one of the rings, for example, ring 1, may have an arm 30 connected thereto and extending outwardly beyond the outer limits of cylinder 10 so that ring 1 can be adjusted relative to ring 2 and thereby vary the registration of groove portions 3a and 3b as is indicated in dot-dash outline in FIG. 3.

Cylinder 10 may, according to conventional practices, include passage means 32 for a heat exchange medium.

It is, of course, to be understood that the present invention is, by no means, limited to the specific showing in the drawings, but also comprises any modifications within the scope of the appended claims.

We claim:

1. In a worm extruder a cylinder having a feed opening near one end and a discharge at the other end, an extrusion worm rotatable in said cylinder for advancing material from said feed opening along said cylinder to said discharge, flow restricting means in said cylinder disposed a predetermined distance downstream from said feed opening and operable to control the quantity of material advanced along said cylinder by said worm, the diameter of said worm being substantially equal to the internal diameter of said cylinder, a collar formed on said worm in the axial range of said flow restricting means and having a cylindrical inner surface substantially the same diameter as said worm, the internal diameter of said flow restricting means being substantially equal to the diameter of said collar, groove means formed radially into said flow restricting means from the inside and extending therealong from one axial side of said collar to the other to provide passage means for the flow of material past the collar, said flow restricting means comprising a pair of rings in end to end relation, a portion of said groove means being formed in each said ring, and means for adjusting said rings relatively in the angular direction thereby to vary the registration of the groove means in the respective rings and in that manner to vary the effective flow area through said flow restricting means.

2. A worm extruder according to claim 1 in which said means for adjusting said rings relatively comprises an adjusting member connected to at least one of said rings and protruding from said cylinder for actuation externally of said cylinder.

3. A worm extruder according to claim 2 in which said means for adjusting said rings relatively comprises an arm fixed to one of said rings and extending radially therefrom to outside said cylinder.

4. A worm extruder according to claim 1 which includes second flow restricting means in said cylinder downstream from the first mentioned said flow restricting means.

5. A worm extruder according to claim 1 which includes means for adjusting said flow restricting means to vary the degree of restriction to flow presented thereby.

6. A worm extruder according to claim 1 in which said groove means is inclined in the axial direction.

7. A worm extruder according to claim 1 in which said groove means comprises at least one groove extending generally helically inside said flow restricting means and terminating short of the opposite ends of the flow restricting means but axially outwardly from the ends of said collar.

* * * * *